United States Patent [19]
Corradini

[11] 4,081,057
[45] Mar. 28, 1978

[54] DEVICE FOR QUICK FASTENING ONE OR MORE WIRE ROPES TO A SOLID BODY, SUCH AS AN ELEVATOR CAR

[75] Inventor: Corrado Corradini, Milan, Italy

[73] Assignee: Societa ' Ascensori Italiani Riuniti-S.A.I.R. Falconi-S.A.F.O.V. - S.p.A., Novara, Italy

[21] Appl. No.: 762,746

[22] Filed: Jan. 26, 1977

[30] Foreign Application Priority Data

Feb. 4, 1976 Italy ................. 19882 A/76

[51] Int. Cl.² ........................... B66B 5/12; B66B 7/08
[52] U.S. Cl. ................................. 187/1 R; 248/223.2; 403/353
[58] Field of Search ............... 187/1 R, 1 A, 20, 27; 294/74, 78 R, 89; 403/315, 316, 319, 353; 248/223.1, 223.2, 60; 211/192; 24/115 R, 116 R, 116 A

[56] References Cited

U.S. PATENT DOCUMENTS

| 611,416 | 9/1898 | Reynolds | 187/1 R |
| 2,551,803 | 5/1951 | Leonard | 294/74 |
| 2,868,332 | 1/1959 | Berry et al. | 187/1 R |
| 3,240,526 | 3/1966 | Schopf et al. | 294/74 |

Primary Examiner—John J. Love
Assistant Examiner—Jeffrey V. Nase
Attorney, Agent, or Firm—Fleit & Jacobson

[57] ABSTRACT

A device for fastening the leaded end of wire ropes to a body. The device comprising a fastening plate of the body having an insertion hole into which the big leaded end of each wire rope can penetrate and at least one fastening hole having the exact necessary dimension to fasten the rope, the insertion and fastening holes being connected to one another through a passage way having a width at least as great as the rope diameter and less than the diameter of the fastening hole.

4 Claims, 3 Drawing Figures

DEVICE FOR QUICK FASTENING ONE OR MORE WIRE ROPES TO A SOLID BODY, SUCH AS AN ELEVATOR CAR

The present invention relates to a device for fastening wire ropes which have to be safely secured to a body, such as for example an elevator car which hangs on said ropes.

For instance, referring to elevators or lifts, these generally comprise a driving unit for moving through a set of ropes a balanced system including the car and associated counterweight.

The fastening of these ropes to the elevator car frame and to the counterweight frame is of essential importance from operation safety standpoint.

To this end, there are quite precise standards also from national and international regulations.

So far, the rope fastening has been carried out by inserting one of the rope ends in a hollow cone-shaped member, opening and spreading out said rope end as soon as introduced and filling up the hollow space containing the rope end with lead or the like. In this way a lead sealing or covering was carried out and a cone or socket was formed, as it is well known in rope fastening devices. Such an element will have a substantially larger diameter than the rope. Therefore, the insertion of each rope in the associated hole provided in each elevator car hitherto required to thread or insert each of the wire ropes into the related hole for the whole rope length, starting from the outer free end of the rope.

When taking into account that in lifts the ropes are always at least in number of two and that each rope has a length about twice the car travel, one understands that this threading or inserting operation required a substantial time, either in case of system installation, or in case of replacing the ropes for maintenance.

Furthermore, when one end of the rope was sealed or covered with lead at factory, the other end could not be secured to the counter-weight by means of lead sealing or covering, but only by a set of clamps and threaded tie-rods.

This disadvantage was overcome by some manufacturers providing rope lead sealing or covering at building yard. Indeed, this approach avoids threading or inserting operation for the whole rope length, but involves the disadvantage of requiring that a lead melting furnace has to be available at the building yard. Moreover, lead sealing or covering as carried out by such an extremely handicraf system would not provide the same reliability as lead sealing or covering carried out by suitable means at factory. It is the object of the present invention to provide a novel rope fastening device which, still complying with safety standards, will allow a substantial time saving in rope assembling and affords the use of lead sealing or covering as carried out at factory.

According to the present invention, the above specified object has been attained by providing at the region of fastening to the body (counterweight or car) an insertion hole, where an enlarged, lead sealed or covered end of the rope can enter, said insertion hole being joined to one or more fastening holes (one for each rope) having a diameter corresponding to the narrowest portion of the lead sealing or covering, whereas the free passage between said insertion hole and said individual fastening holes for the ropes is smaller than the diameter of the fastening hole and preferably slightly larger than the diameter of each of said ropes.

According to an improvement of the invention, provision is made for a plate closing said insertion hole, which plate is secured to the body hanging on the ropes, so that the ropes are prevented from coming out of the respective fastening holes, should a serious collision occur.

Preferably, said hole closing plate or disc is provided with a central sliding shaft having normally a position defined by the action of a spring or the like. From said position, the shaft can be moved due to loosening also of one single rope, an alarm system being controlled by the movement of said shaft. Therefore, the lead sealed or covered end of each rope is provided with an abutment forming a seat for a spring, which tends to move the end of said rope away from its normal position, thereby striking a projecting portion integral with said shaft as soon as a rope tends to become loose.

Particularly, in case of elongation or breakage in a rope, the fastening socket abruptly urges downward the projection integral with said sliding shaft, so as to change over a microswitch or the like acting as an alarm and blocking any operation.

In order to clarify the present invention, an exemplary embodiment will now be described as shown in the accompanying drawings, in which:

FIG. 1 is a perspective view showing the rope fastening plate, provided for example for four ropes, but in which for the sake of major clarity a single end of one of the ropes has been shown, all of the other ends being similar;

Figure 1:
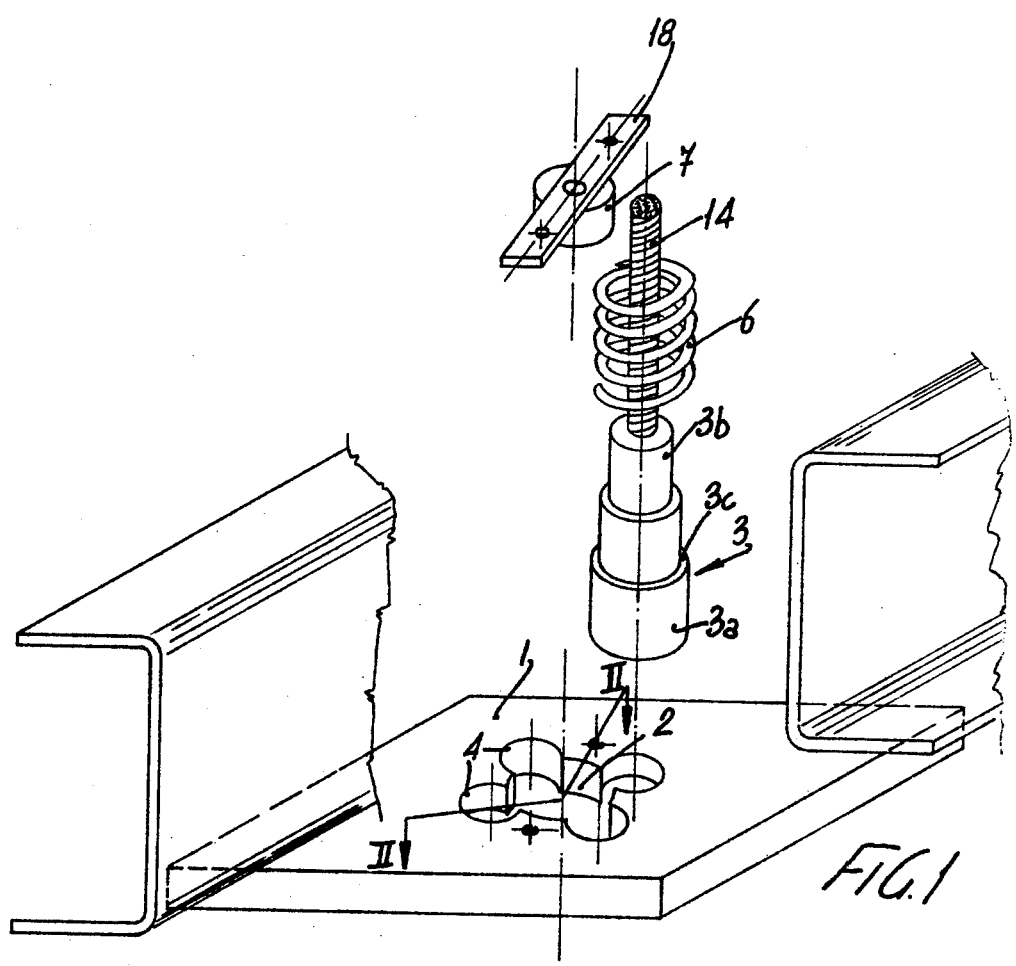

Referring to the drawings, reference numeral 1 denotes the rope fastening plate, that is to say that plate which is integral with the car frame or with the counterweight carrying device. Reference numeral 2 denotes an insertion hole having such a diamter that the widest portion 3a of said bowl or socket 3 can be caused to enter therein.

Figure 3:
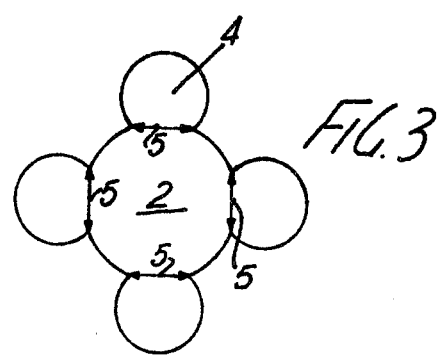
FIG. 3 is a plan view showing the hole as provided in each of the fastening plates for the hanging body.

At different locations of the circumference of said insertion hole 2, there are provided further rope fastening holes 4, the latter having such a diameter that the narrowest end 3b of said bowl or socket 3 can be received therein, while being secant with respect to insertion hole 2, so that the passage width between insertion hole 2 and rope fastening holes 4 is of a value comprised between the diameter of fastening hole 4 and the rope diameter. This spacing has been denoted at 5 in FIG. 3 and serves for rope insertion, as discussed in the following.

Bowl or socket 3 of each rope 14 is secured to said plate 1 by means of a spring 6 having such a diameter that it can bear on an abutment 3c provided between portion 3a of said bowl or socket having a major diameter and a subsequent portion having a smaller diameter. The other end of sping 6 will bear on the underside of plate 1 and will be arranged so as to tend to move bowl or socket 3 away from said plate 1.

Preferably, said insertion hole 2 is closed by a disc 7 which is secured by means of a crosspiece 18 integral therewith. This crosspiece is, for example, screwed to plate 1 by means of screws 19.

Said disc 7 preferably has a central hole 8, in which a shaft 9 is slidable, said shaft carrying at one end a lug or projecting portion 10 integral therewith, while being provided at its outer end with a cam 11 which, for example, is cone-shaped and can drive a microswitch 12 having a plunger 12a contacting with the surface of cone 11. Between this cam 11 and crosspiece 18 integral with closure disc 7 a spring 13 is provided which holds said shaft 9 at raised position, causing an abutment 14 thereon to adhere with the underside of disc 7. At rest position, projecting portion 10 secured to the lower end of shaft 9 is at a short distance from the lower end of bowl or socket 3 of each rope 14.

The ropes are assembled as follows: by means of inserting hole 2, bowl or socket 3 of each rope is inserted until said bowl or socket is completely below said plate 1. At this position, only rope 14 is at the same height or level as plate 1, so that it can be introduced into the narrow passage 5, shown in FIG. 3, and enter hole 4 having such a major diameter to accomodate the minor end 3b of each bowl or socket 3 provided on each end of ropes 14.

By this simple operation, one end of the previously lead sealed or covered rope has been secured to the frame of the hanging body.

For increased safety, it is provided that a disc 7 close said hole 2, when all of ropes 14 have been inserted in their associated fastening holes 4. Fastening of said disc 7 is very simply carried out by screwing such means as bolts 19 introduced into said crosspiece 18 integral with said disc 7, which bolts are screwed in plate 1. This closure disc 7 serves the purpose of preventing, under conditions of abnormal tensions in the ropes, for instance, in case of collision, the end of a rope from reentering hole 2, thereby becoming loose.

Figure 2:
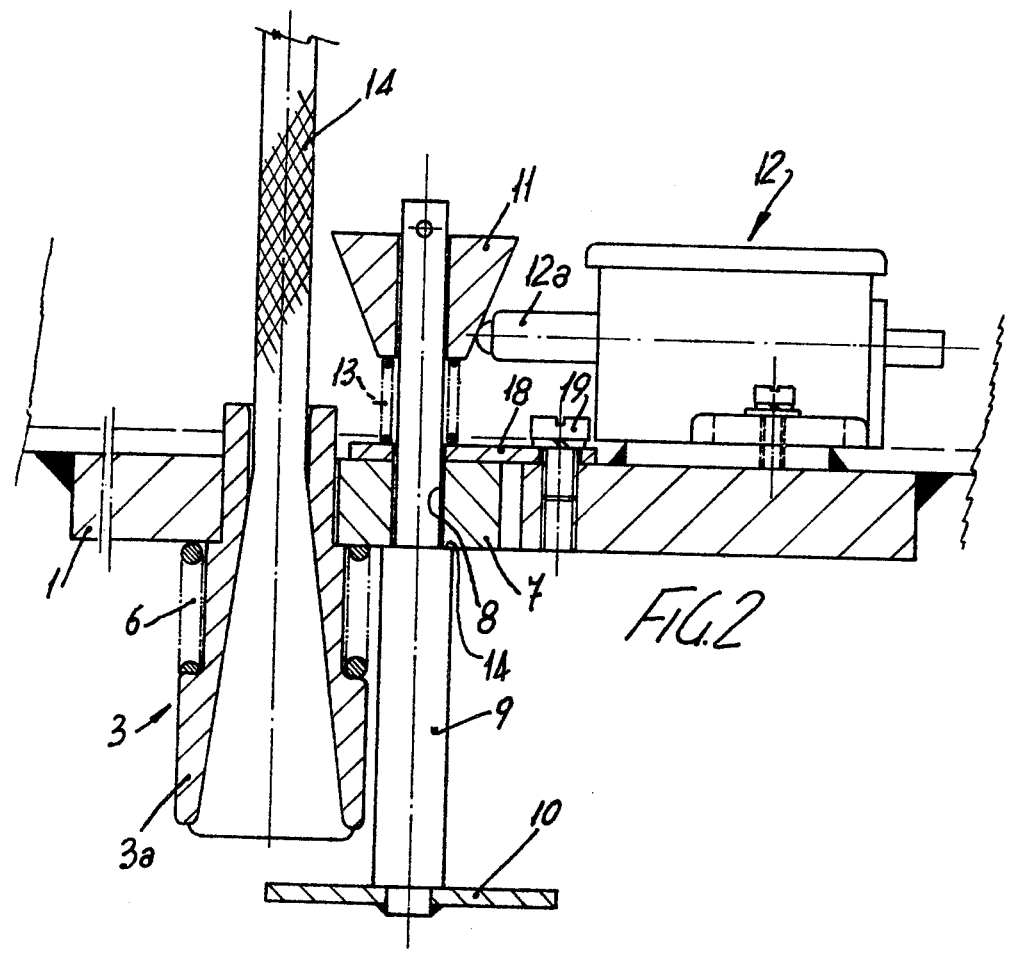
FIG. 2 is a sectional view taken along line II—II of FIG. 1.

Preferably, it is also provided that sliding shaft 9 is located centrally of said disc 7 and has the rest position as shown in FIG. 2, which position can be changed against the action of spring 13, when any rope 14 becomes loosened and accordingly the associated sping 6 urges said bowl or socket 3 against projecting portion 10.

Thus, in a very simple manner, in addition to rope fastening also an alarm device has been provided controlling the loosening or even breakage of any rope.

What is claimed is:

1. A device for fastening an end of a wire rope to a body, the end having attached thereto a stepped member whose diameter increases in a direction away from the rope from a first diameter larger than that of the wire rope to a second diameter larger than said first diameter, the device comprising a fastening plate integral with the body and having an opening defined therein, the opening having an insertion portion with a diameter at least as large as the second diameter of said member, a fastening portion with a diameter at least equal to the first diameter of said member and less than the second diameter of said member, and a connecting portion connecting said insertion and fastening portions and having a width at least as large as the diameter of the rope and less than the first diameter of said member.

2. A device as claimed in claim 1 further comprising a closure disc adapted to be connected to said fastening plate after the member attached to the wire rope has been inserted in said fastening portion of said fastening plate, said closure disc reducing the size of said insertion portion so that its diameter is less than the second diameter thereby insuring the retention of said member in said fastening plate.

3. A device according to claim 2, further comprising a sensing device, a shaft, and spring means and wherein said closure disc has a central hole, in which the shaft is slidable, the shaft carrying a cam operatively associated with the sensing device and a projecting portion, the normal position of the latter being defined by the spring means, said projecting portion being positioned so that it is operated by rope loosening or breakage, thus providing an alarm system.

4. A device as claimed in claim 1 wherein the diameter of the stopped member increases from the first diameter to an intermediate diameter to the second diameter, the intermediate diameter being greater than both the first diameter and the diameter of the fastening portion and less than the second diameter, said device further comprising biasing means adapted to be positioned between said fastening plate and the second diameter portion of the stepped member thereby biasing the stepped member away from said fastening plate.

* * * * *